United States Patent [19]
Friendship

[11] 3,886,253
[45] May 27, 1975

[54] PROCESS FOR HEAT TREATING PLASTIC BOTTLES

[75] Inventor: Kenneth F. M. Friendship, Hinsdale, Ill.

[73] Assignee: Continental Can Company, Inc., New York, N.Y.

[22] Filed: Apr. 24, 1972

[21] Appl. No.: 246,716

[52] U.S. Cl. .................. 264/238; 53/25; 264/94; 264/235; 264/346; 432/253
[51] Int. Cl. .................. B29c 17/07; B29c 25/00
[58] Field of Search .......... 264/234, 235, 345, 346, 264/DIG. 78, 238; 53/25, 127, 26, 160; 34/105, 201, 202; 432/231, 253

[56] References Cited
UNITED STATES PATENTS

| | | | |
|---|---|---|---|
| 1,885,691 | 11/1932 | Dressler | 432/253 |
| 2,344,640 | 3/1944 | Rogers | 53/25 |
| 2,405,216 | 8/1946 | Josh | 53/25 X |
| 3,317,642 | 5/1967 | Bailey | 264/235 X |
| 3,561,188 | 2/1971 | Cleland | 53/26 |

*Primary Examiner*—Jan H. Silbaugh
*Attorney, Agent, or Firm*—Diller, Brown, Ramik & Wight

[57] ABSTRACT

This disclosure relates to a process of reducing the creep characteristics of plastic containers, principally bottles, jugs or the like, by first providing a cartridge having upper and lower ends and a plurality of interconnected chambers, thereafter stacking containers atop each other in an upright position in each chamber, transferring the cartridge into a heat treatment bay, supporting the lowermost containers during the cartridge transfer, circulating hot air through and between the chambers for a predetermined period of time, removing the cartridge from the heat treatment bay, and thereafter closing the upper and lower ends of the cartridge whereby the same may be stored and/or transported for filling or similar processing.

15 Claims, 6 Drawing Figures

PROCESS FOR HEAT TREATING PLASTIC BOTTLES

It is well known that plastic material has "creep" characteristics which are generally undesired and can be reduced and/or eliminated by appropriate heat treatment timewise and temperaturewise depending, of course, upon the characteristics of the polymeric or copolymeric material involved. By reducing the creep characteristics of bottles, jugs or similar containers dimensional stability is increased and tolerances become less critical, particularly in regard to volumetric capacity and capping. However, even though heat treatment is recognized as a solution to undesired plastic material creep, such must be accomplished quite obviously at a minimum cost which necessarily requires an efficient use of labor and material. Otherwise, the natural competitive nature of plastic material is deteriorated to the point where metallic containers would be used instead.

In view of the foregoing it is a primary object of this invention to provide a novel process of reducing the creep characteristics of plastic containers, principally bottles, jugs, etc., by providing a cartridge having upper and lower ends and a plurality of interconnected chambers, stacking containers atop each other in an upright position in each chamber, transferring the cartridge into a heat treatment bay, supporting the lowermost containers during the cartridge transfer, circulating hot air through and between the chambers for a predetermined period of time to achieve creep resistance, removing the cartridge from the heat treatment bay, and thereafter closing the upper and lower ends of the cartridge.

A further object of this invention is to provide a novel process of the type heretofore described wherein the upper and lower ends may be initially closed and if closed clamped to the cartridge, and if so including the further steps of unclamping and removing the covers respectively, prior to the step of transferring the cartridge into the heat treatment bay.

Another object of this invention is to provide a novel process of the type aforesaid wherein the stacking of the containers is immediately preceded by the step of blow molding the containers.

Yet another object of this invention is to provide a novel process of the type heretofore set forth including the further steps of transferring the closed cartridge to a filling station, removing at least one of the covers, removing the containers and filling the containers in the absence of a cleaning or similar cleansing step.

A final object of this invention is to provide a novel process of increasing creep resistance in polymeric, copolymeric or similar containers and to do so in the absence of distortion by maintaining the stacked height of the containers in each chamber up to approximately 7 feet.

With the above and other objects in view that will hereinafter appear, the nature of the invention will be more clearly understood by reference to the following detailed description, the appended claimed subject matter, and the several views illustrated in the accompanying drawings.

IN THE DRAWINGS

Figure 2:
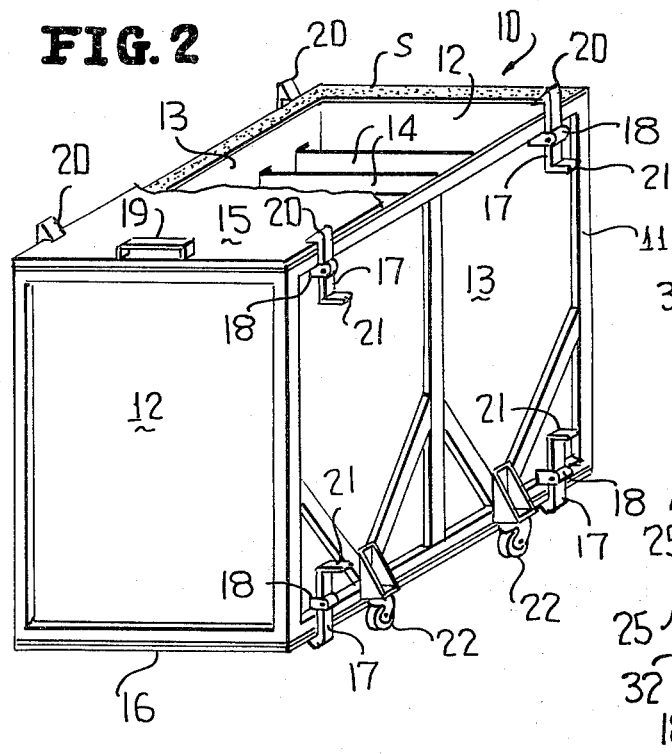
FIG. 2 is a perspective view of a cartridge constructed in accordance with this invention, and illustrates the same as having upper and lower ends closed by covers which can be clamped thereto and interior partitions which are vertically foreshortened at their upper ends define chambers into which the bottles are stacked.

Before describing the novel process of this invention a brief description of ancillary apparatuses is considered necessary and reference is first made to FIG. 2 of the drawings which discloses a container or cartridge generally designated by the reference numeral 10. The cartridge 10 is constructed from metallic or similar material and conventionally secured to a frame 11 thereof are end panels 12, 12, side panels 13, 13 and a plurality of partition panels 14 spanning and suitably secured between the side panels 13, 13. The partition panels 14 terminate short of the open upper end (unnumbered) of the cartridge 10 and preferably extend completely to the bottom.

Although upper and lower ends (both unnumbered) of the cartridge 10 are open the same are closed by covers 15, 16 having at the ends thereof adjacent the panels 12, 12 handles 19.

The covers 15, 16 are normally clamped in their closed positions by clamping fingers 17 pivotally mounted to brackets 18 which are in turn secured to the frame 11. Each clamping finger 17 has a nose 20 which engages the associated cover 15 or 16 in a conventional manner while opposite thereto is a projecting arm 21 which is actuated by an unclamping mechanism to be described more fully hereinafter.

Inasmuch as the cartridge 10 is designed for movement during successive operations of the process, as well as for purposes of storage and shipment, the frame 11 has secured thereto suitable dolly wheels 22 each having a V-shaped periphery (FIG. 4) for movement along similarly contoured tracks.

Figure 3:
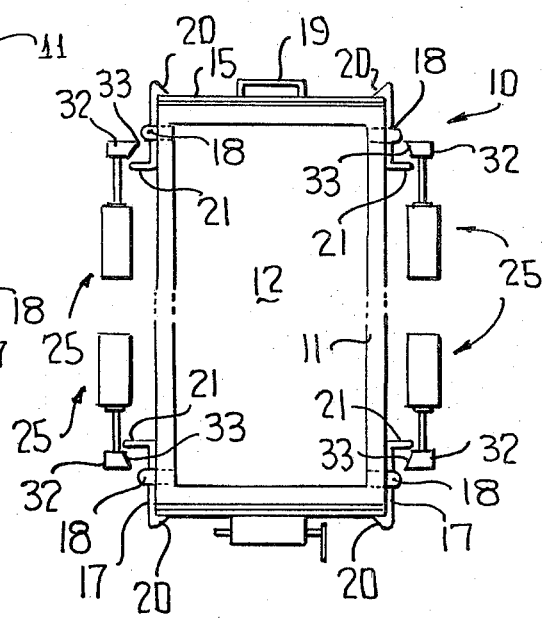
FIG. 3 is an end elevational view, and illustrates the manner in which means may be provided for unclamping the clamps incident to the removal of the upper and lower covers prior to heat treatment.
Figure 4:
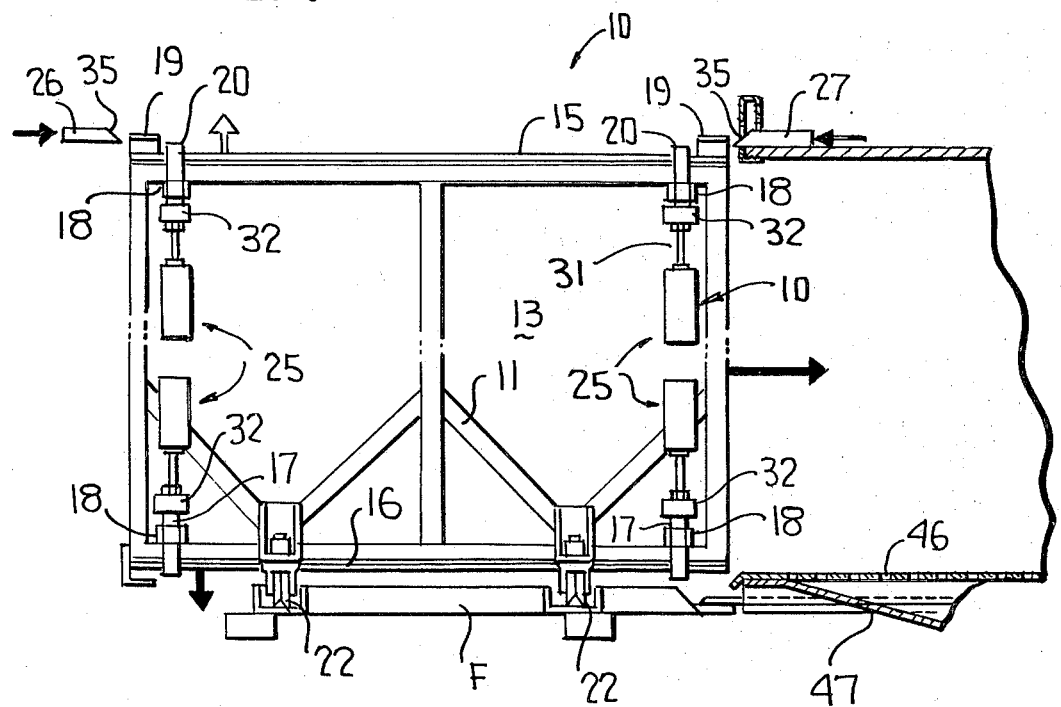
FIG. 4 is a fragmentary side elevational view looking from right-to-left in FIG. 3, and illustrates the manner in which the upper and lower covers are supported while the cartridge and the bottles therein are transferred into a heat treatment bay.

Reference is now made to FIGS. 3 and 4 which illustrate further apparatus operable in the process of this invention which includes identical means 25 for unclamping the clamping fingers 17 and means 26, 27 for supporting the upper cover 15 upon the unclamping thereof from the cartridge 10. The unclamping means 25, 25 include unclamping elements 32 each having a wedging surface 33. Each unclamping element 32 is carried by a piston rod 30 of an air cylinder 31 which is actuated in a manner to be described more fully hereinafter. As can be best visualized in FIG. 3, movement of the upper and lower unclamping means 25 toward each other results in the surfaces 33 riding against the arms 21 of the clamping fingers 17 thereby pivoting the noses 20 to a position out of overlying relationship to the covers 15, 16 to permit the subsequent movement of the cartridge 10 in the absence thereof.

One example of removing means 26, 27 are simply a pair of arms reciprocated by pneumatic or similar means toward and away from each other after the unclamping of the clamping fingers 17 has taken place. However, the upper cover 15 is preferably raised slightly after the unclamping and to effect this action each of the removing means includes a cam surface 35. Thus, as the means 26, 27 are reciprocated toward each other the camming surfaces 35 engage the handles 19 to raise the cover 15 to a position sufficiently above the upper end (unnumbered) of the cartridge 10 to permit its unobstructed transfer. The lower cover 16 merely drops upon the lower frame F upon the release of the associated clamping fingers 17.

Figure 1:
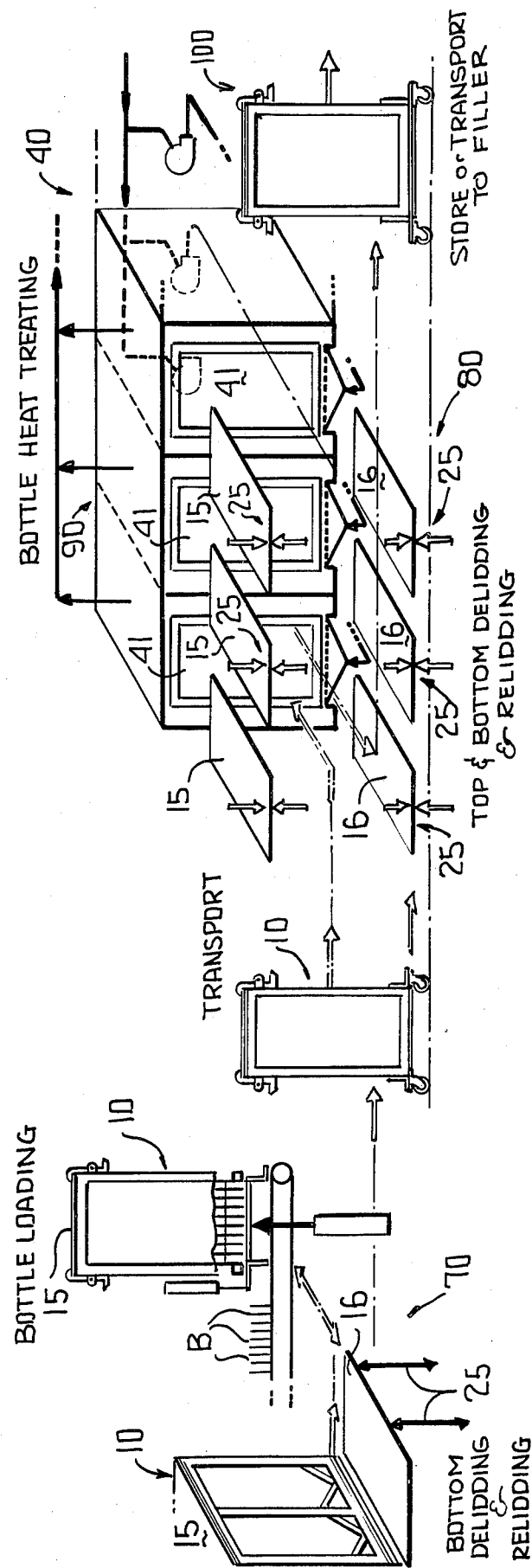
FIG. 1 is a schematic view of a process in keeping with this invention, and illustrates the manner in which plastic bottles are binned in a chambered cartridge, closed, transferred to a treatment station, opened, subjected to heat treatment, closed thereafter, and stored and/or transported prior to filling.
Figure 5:
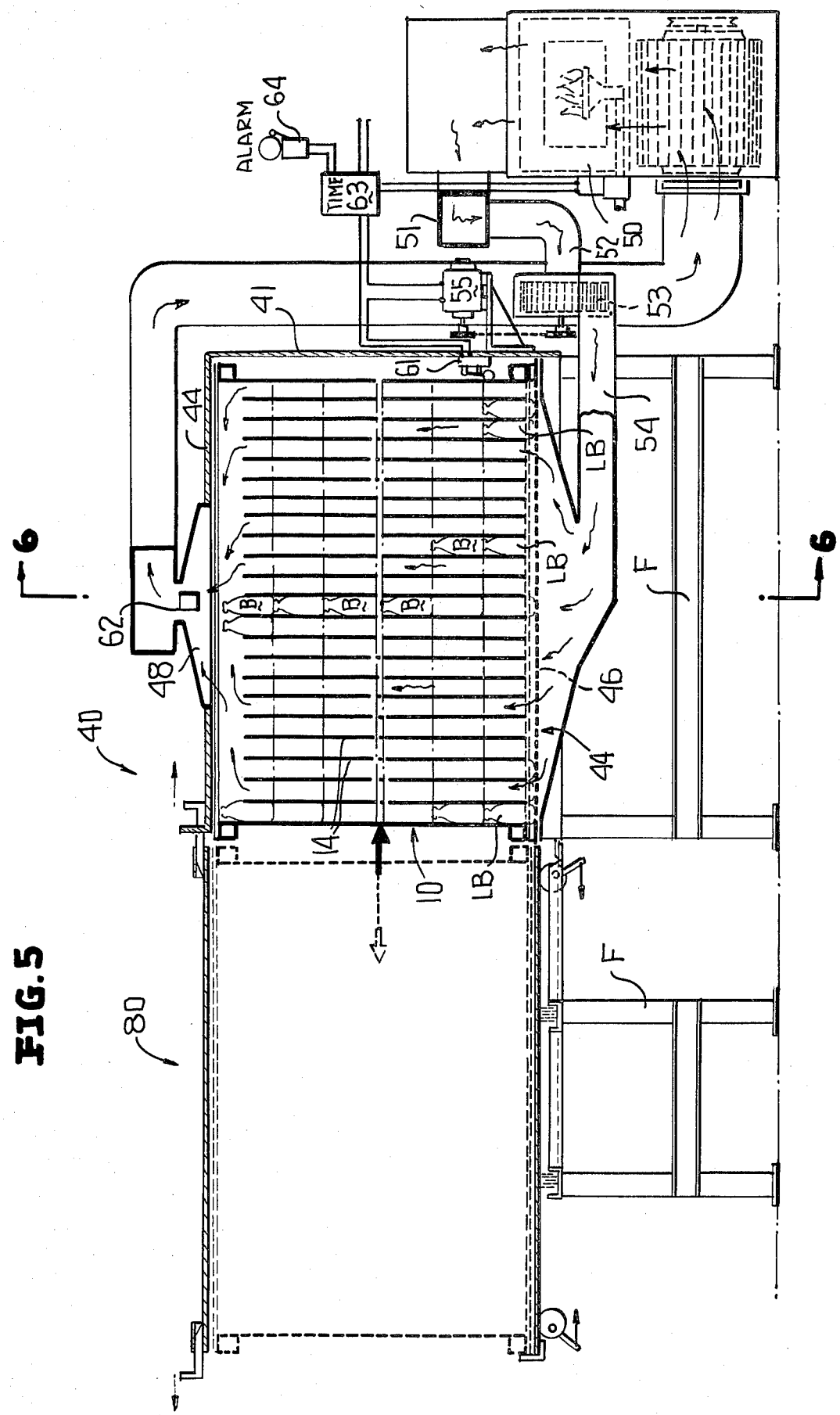
FIG. 5 is a cross-sectional view taken through the heat treatment bay of FIG. 4, and more clearly illustrates the manner in which air is circulated through the chambers of the cartridge to increase the creep resistance of the bottles packaged therein.
Figure 6:
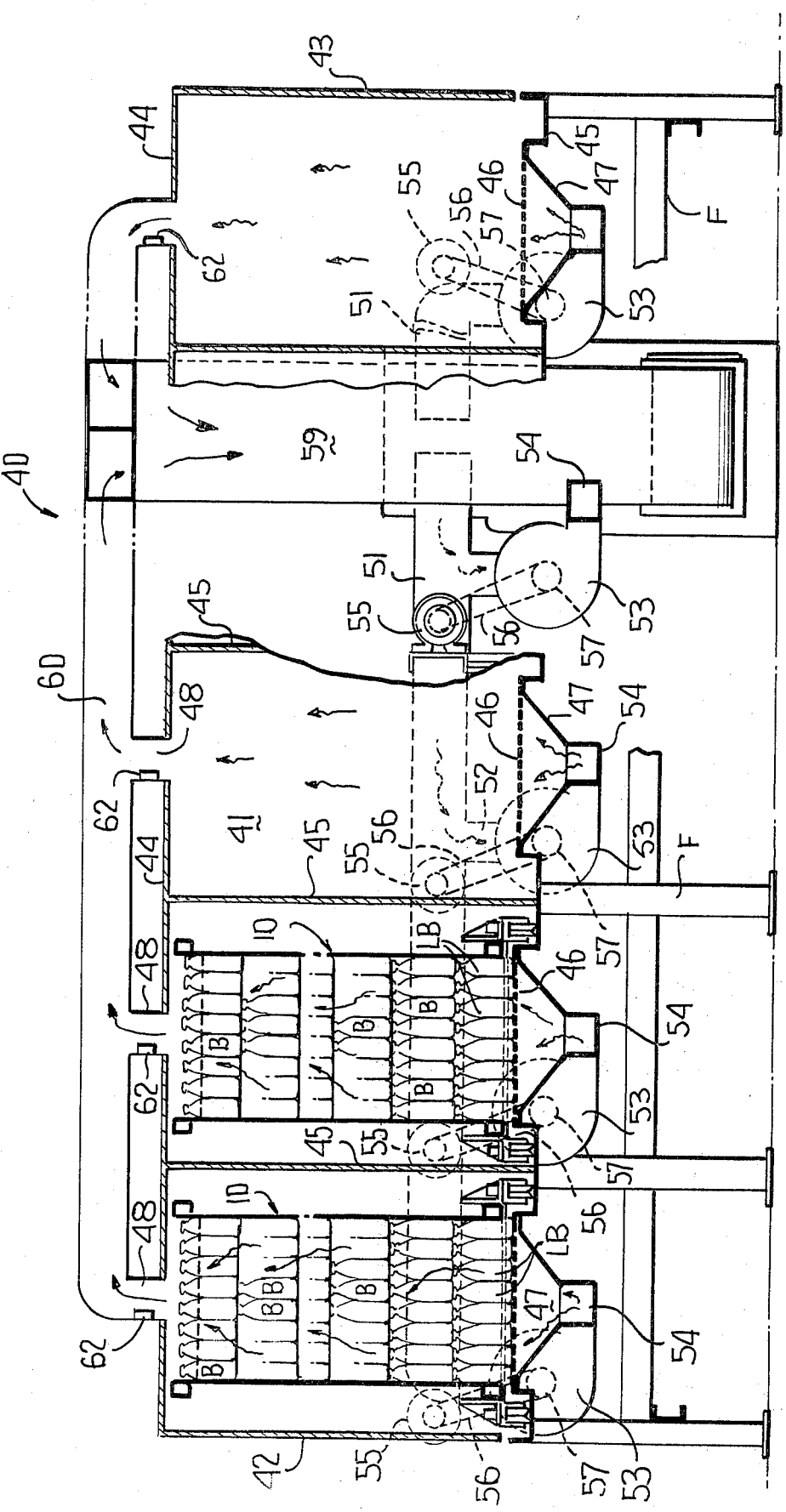
FIG. 6 is a sectional view taken generally along line 6—6 of FIG. 5, and illustrates the manner in which a plurality of heat treatment bays, the number depending upon the output of blow molding machines, are arranged in side-by-side relationship for batch processing purposes.

The final major apparatus requiring description prior to the description of the overall processes of FIG. 1 is a heat treatment machine generally designated by the reference numeral 40 in FIGS. 5 and 6. The heat treatment machine 40 is supported upon the frame F which conventionally includes horizontal and vertical support members (unnumbered) as might be found necessary or desirable. The heat treatment machine 40 is of a cubic configuration and is of size sufficient to receive one of the cartridges 10 in each of a plurality of heat treatment bays 41 when inserted thereinto from left-to-right as viewed in FIG. 5, with two such cartridges 10 and bays 41 being shown in side-by-side relationship in FIG. 6. The heat treatment machine 40 includes a rear wall (unnumbered), side walls 42, 42, a top wall 43, a bottom wall 44, a plurality of partitions 45 and doors (not shown) for closing the front of the heat treatment machine 40 which, as viewed in FIG. 5, is the left-hand side thereof.

As is best illustrated in FIG. 6, the bottom wall 44 includes a plurality of apertured floor portions 46 which in cross-sectional area correspond to the open bottom end of an associated cartridge 10. To either side of each floor portion 46 is a rail (unnumbered) upon which the dolly wheels 22 may ride for moving each cartridge into and out of its associated heat treatment bay 41, in the manner best visualized in FIG. 6. Each floor portion 46 may be simply a plurality of apertures in the bottom wall 44 or, for example, a plurality of parallel rods or similar supports with at least one rod underlying each lowermost bottle LB of the bottles B in the cartridges 10. Beneath each floor portion 46 is a manifold 47 which likewise defines a chamber having a maximum area equal to that of the open bottom ends of the cartridges 10, as is most readily apparent from a comparison of FIGS. 5 and 6. By virtue of the size of each floor portion 46 and the associated manifold 47 hot air can be distributed to and through the entire volume of each cartridge 10, and particularly each of the chambers (unnumbered) thereof defined between the partitions 14.

Hot air introduced into each cartridge is removed therefrom by return manifolds 48 (FIG. 5) centrally located above each cartridge 10 which are placed in communication with the interior of each heat treatment bay 41 by apertures (unnumbered) in the top wall 43.

A heater 50, which in this case is gas powered, supplies hot air which is conducted to the manifolds 47 through a main header or duct 51 connected by a plurality of elbows 52 to pumps or blowers 53 connected by conduits 54 to each of the manifolds 47. The blowers 53 are each energized by an electric motor 55 and are driven by appropriate belts 56 and pulleys 57 in a conventional manner.

In much the same manner each manifold 48 is connected by a main header or duct 60 to a vertical duct 59 which returns the air to the heater 50, thereby establishing a closed circuit system for hot air flow.

The blower motors 55 are each energized automatically upon the closing of a circuit (not shown) which includes a switch 61 associated with each bay 41, one of which is illustrated in FIG. 5. Each switch 61 is suitably mounted internally of its associated heat treatment bay 41 upon the rear wall (unnumbered) and is closed upon movement of an associated cartridge 10 in contact therewith. The blower will then circulate hot air which is heated by the heater 50. When the temperature at the outlet duct from a treatment bay reaches a predetermined setting, a temperature sensing element 62 will close a switch, not shown, and a timer 63 will be started through conventional circuitry. After a predetermined time period dependent upon the timing-out of the timer 63, the motor 55 associated therewith will be automatically cut off and an alarm 64 will be sounded to indicate that the heat treatment operation has been completed in that particular heat treatment bay 41.

Reference is now made to FIG. 1 of the drawings which illustrates the process of this invention as being initiated by a binning or packaging operation which immediately succeeds the blow molding of the bottles B from polyethylene or similar polymeric or copolymeric plastic material. For purposes of description the binning or loading operation is indicated by the reference numeral 70 and the function thereof is simply that of completely filling each chamber (unnumbered) defined by the partitions 14 of each cartridge 10 with the bottles B in the manner readily apparent from FIGS. 5 and 6. The details of the binning apparatus form no part of this invention but reference may be made to U.S. Pat. Nos. 3,534,525 and 3,561,188 each issued in the name of Keith B. Cleland on Oct. 20, 1970, and Feb. 9, 1971, for more specific details of the binning apparatus.

As is more likely than not the case, the manufacturer and shipper of the bottles B is not the filler or packager thereof, and accordingly the bottles will be heat treated prior to shipment to the packager. In keeping with the process of FIG. 1 the cartridges 10 may be loaded with the bottles B at a position adjacent to the molding machines and then closed by the covers 15 and 16, after which they may be transported to another position in the plant for heat treatment. However, in FIG. 1 the loading operation is performed remote from the blow molding machines, and it is assumed that each cartridge when properly positioned at the station 70 includes both its upper and lower covers 15, 16 clamped thereto. Accordingly, the station 70 includes unclamping means corresponding to the lower unclamping means 25 of FIG. 3 for unclamping the lower fingers 17 to permit the automatic or manual removal of the cover 16 incident to the loading of the bottles B into the chambers (unnumbered) of the cartridge 10 from beneath in the manner described more fully in the latter-noted patents, after which the bottom cover 16 is replaced and the unclamping means 25 are released to secure the bottom cover 16 to each cartridge 10.

Thereafter at each heat treatment bay 41 the fingers 17 are again unclamped in the manner heretofore described relative to FIGS. 3 and 4 and the covers 15, 16 of each cartridge 10 are removed at a station 80 which forms part of each treatment bay 41. The station 80 may have the apparatus heretofore more specifically described relative to FIGS. 3, 4 and 5 to remove and/or replace both top and bottom covers 15, 16, respectively. At this point it is noted that though the bottom cover 16 has been released and dropped, it drops to a position in alignment with its associated floor portion 46 (FIG. 4) and thus the bottles B are supported by the lower bottles LB resting upon the cover 16 and subsequently upon each of the floor portions 46 as each cartridge 10 is inserted into its position within the heat treatment bay 41 resulting in the eventual heat treatment of the bottles upon the operation of the system heretofore described relative to FIGS. 5 and 6. The heat treatment station is generally designated by the reference numeral 90.

After the completion of the heat treatment operation each cartridge 10 is removed, relidded and hermetically sealed by means S (FIG. 3) by a gasket at the station 80 and is thereafter stored and/or transported, as indicated by the reference numeral 100, for eventual reopening and filling.

In actual practice and particularly by laboratory trial, it has been established that plastic bottles for carbonated beverages, such as beer, soda, or the like, must be subjected to the heat treatment operation while oriented in an upright position with the necks thereof uppermost to prevent distortion and when stacked in the cartridges 10, the height must be no more than approximately seven feet. Moreover, the process preferable to the overall invention is that described relative to FIG. 1 since the bottles after being blow molded or similarly formed can be maintained in their upright position through the overall process and are not jumbled as is typically done for mass commercial shipping purposes. It other words, the bottles can be sealed against outside environment, loaded and unloaded without losing the upright orientation thereof after manufacture.

Further advantages of the processes of this invention are as follows:

1. Orientation of the bottles, as heretofore noted, would be maintained from the time they are blow molded until they are filled and packed which eliminates the need for unscrambling machines.
2. A single cartridge 10 is used as the sole means of stacking, holding for heat treating, storing, and transporting of the bottles B.
3. Each cartridge 10 makes an efficient small oven for heat treating the bottles B in conjunction with the individual heat treatment bays 41. In this manner air from the manifold 47 is prevented from flowing anywhere other than directly through the associated cartridge 10 and thus flows outwardly through the header 60 which also permits a more accurate control of the temperature of each cartridge singularly or collectively. In this regard it is to be noted that the upper foreshortening of the partitions 14 permit excellent air flow, as indicated by the uppermost unnumbered arrows in the container 10 of FIG. 5.
4. The overall system utilizes centralized ducting and thereby serves a multiple number of treatment bays 41 and cartridges in a most simple and economical manner.
5. After heat treatment which is not only sufficient to accomplish creep resistance but to also sterilize the bottles B, the same since they are sealed in each cartridge due to the seals at the upper and lower ends of the latter heretofore noted do not require washing or rinsing prior to filling, thereby eliminating washing, rinsing, or like cleansing equipment in the packager's filling line.
6. There is exemplified a clear economy in the process (FIG. 1) in personnel as well as the equipment involved.
7. From a storage and/or transportation standpoint less space is required as the bottles B can be accumulated in the chambers (unnumbered) defined between the partitions 14 than when "jumbled," packed and shipped.

While preferred forms and arrangements of parts have been shown in illustrating the invention, it is to be clearly understood that various changes in details and arrangement of parts may be made without departing from the spirit and scope of this disclosure.

I claim:

1. A process of reducing the creep characteristics of plastic containers comprising the steps of providing a cartridge having upper and lower ends and a plurality of vertically extending transversely interconnected chambers also having upper and lower ends, stacking containers vertically upwardly through the lower ends of the chambers toward the upper ends thereof atop and in contact with each other in an upright position in each chamber, transferring the cartridge into a heat treatment bay, circulating hot air in contact with the plastic containers in a direction upwardly from and through the lower ends through the upper ends in open condition and through and between the chambers for a predetermined period of time and at a predetermined temperature sufficient to reduce the creep characteristics of the plastic containers, and removing the cartridge from the heat treatment bay.

2. The process as defined in claim 1 wherein said upper end is initially closed by a cover, including the further step of removing the cover prior to the step of transferring the cartridge into the heat treatment bay.

3. The process as defined in claim 2 wherein said initially closed covers are clamped closed relative to said cartridge, including the further step of unclamping the covers prior to the removal thereof from the cartridge.

4. The process as defined in claim 2 wherein the containers in each chamber are stacked to a height of approximately 7 feet.

5. The process as defined in claim 1 wherein said upper and lower ends are initially closed by covers after the step of stacking containers in each chamber, and including the added step of removing the covers prior to the step of transferring the cartridge into the heat treatment bay.

6. The process as defined in claim 5 wherein the containers in each chamber are stacked to a height of approximately 7 feet.

7. The process as defined in claim 1 wherein the containers in each chamber are stacked to a height up to approximately 7 feet.

8. The process as defined in claim 1 wherein the stacking step is performed by upwardly feeding successive rows of containers from a predetermined linear position into a first vertically aligned chamber followed by the step of relatively indexing the cartridge and succeeding containers normal to each other in the direction of feed to position a second chamber in alignment for upward feeding of containers from said predetermined linear position, and thereafter feeding successive rows of containers from said predetermined linear position into said second vertical aligned chamber.

9. The process as defined in claim 8 including the step of evacuating hot air from the upper end of the cartridge at a point between extreme opposite ones of said chambers, and placing all upper ends of said chambers in fluid communication with said point.

10. The process as defined in claim 9 wherein said upper end is initially closed by a cover, including the further step of removing the cover prior to the step of transferring the cartridge into the heat-treatment bay.

11. The process as defined in claim 8 including the step of supporting all containers in the cartridge through the lowermost row of containers in each chamber, and circulating the hot air from one side of the point of container support to an opposite side thereof.

12. The process as defined in claim 11 wherein said upper end is initially closed by a cover, including the further step of removing the cover prior to the step of transferring the cartridge into the heat-treatment bay.

13. The process as defined in claim 8 wherein said upper end is initially closed by a cover, including the further step of removing the cover prior to the step of transferring the cartridge into the heat-treatment bay.

14. The process as defined in claim 1 including the step of evacuating hot air from the upper end of the cartridge at a point between extreme opposite ones of said chambers, and placing all upper ends of said chambers in fluid communication with said point.

15. The process as defined in claim 14 wherein said upper end is initially closed by a cover, including the further step of removing the cover prior to the step of transferring the cartridge into the heat-treatment bay.

* * * * *

UNITED STATES PATENT AND TRADEMARK OFFICE
CERTIFICATE OF CORRECTION

PATENT NO. : 3,886,253
DATED : May 27, 1975
INVENTOR(S) : Kenneth F.M. Friendship It is certified that error appears in the above-identified patent and that said Letters Patent are hereby corrected as shown below:

Column 5, line 33, change "3" to --2--.

In the drawings, amend Figure 3 as follows:
Attach reference numerals "30" to the two vertical bars extended downward from the two upper members 32, and to the two vertical bars extending upward from the two lower members 32; attach reference numerals 31 to the four unnumbered blocks connected to the aforementioned four vertical bars 30; attach reference numeral "16" to the bottom wall of the overall structure 10. Amend Figure 4 by attaching reference numerals "30" and "31" to the appropriate blocks as described above with respect to Figure 3; attach reference numerals "17" to the two blocked portions located, respectively, between the two upper members 32 and the two upper members 18.

Amend Figure 6 by changing reference numeral "44" to --43-- and reference numeral "43" to --42--.

Signed and Sealed this

Fifth Day of October 1976

[SEAL]

Attest:

RUTH C. MASON
Attesting Officer

C. MARSHALL DANN
Commissioner of Patents and Trademarks